US008803537B2

(12) United States Patent
Buehler et al.

(10) Patent No.: US 8,803,537 B2
(45) Date of Patent: Aug. 12, 2014

(54) SOLAR MODULE TEST CONTROL

(75) Inventors: Pat Buehler, Perrysburg, OH (US); Sumanth Varma Lokanath, Monclova, OH (US); Madhu Sayala, Plano, TX (US); Christinia Snider, Genoa, OH (US); Jim Sorensen, Whitehouse, OH (US); Paul Wolffersdorff, Toledo, OH (US)

(73) Assignee: First Solar, Inc., Perrysburg, OH (US)

( * ) Notice: Subject to any disclaimer, the term of this patent is extended or adjusted under 35 U.S.C. 154(b) by 518 days.

(21) Appl. No.: 13/030,658

(22) Filed: Feb. 18, 2011

(65) Prior Publication Data

US 2011/0204909 A1    Aug. 25, 2011

Related U.S. Application Data

(60) Provisional application No. 61/306,841, filed on Feb. 22, 2010.

(51) Int. Cl.
*G01R 31/00* (2006.01)
(52) U.S. Cl.
USPC ............ 324/750.03; 324/750.01; 324/761.01; 324/96; 250/214 R; 356/405
(58) Field of Classification Search
USPC ......... 324/96, 750, 752, 761, 750.01, 761.01; 250/214, 214 R; 362/2; 356/405
See application file for complete search history.

(56) References Cited

U.S. PATENT DOCUMENTS

| | | | |
|---|---|---|---|
| 4,423,469 A * | 12/1983 | Zerlaut et al. | ...................... 362/2 |
| 4,467,438 A | 8/1984 | Zerlaut et al. | |
| 6,946,858 B2 * | 9/2005 | Matsuyama | ............. 324/761.01 |
| 2002/0030153 A1 | 3/2002 | Matsuyama | |
| 2002/0171441 A1 | 11/2002 | Jayamaha | |
| 2004/0056648 A1 | 3/2004 | Matsuyama | |
| 2010/0147386 A1 * | 6/2010 | Benson-smith et al. | ...... 136/263 |

OTHER PUBLICATIONS

International Preliminary Report on Patentability and Written Opinion issued in PCT/US2011/025425, dated Sep. 7, 2012.

* cited by examiner

*Primary Examiner* — Patrick Assouad
*Assistant Examiner* — Sean Curtis
(74) *Attorney, Agent, or Firm* — Dickstein Shapiro LLP

(57) ABSTRACT

A method for conditioning a photovoltaic module for testing includes setting an effective irradiance of a continuous light source at a target plane, configuring a test photovoltaic module to operate at a substantially maximum power point configuration, positioning the test photovoltaic module adjacent to the target plane, and configuring the test photovoltaic module for testing by removing the light source, cooling the test module to a testing temperature, and reversing the substantially maximum power point configuration.

20 Claims, 2 Drawing Sheets

US 8,803,537 B2

SOLAR MODULE TEST CONTROL

CLAIM FOR PRIORITY

This application claims priority under 35 U.S.C. §119(e) to U.S. Provisional Patent Application Ser. No. 61/306,841 filed on Feb. 22, 2010, which is hereby incorporated by reference.

TECHNICAL FIELD

The present invention relates to photovoltaic modules and methods of production.

BACKGROUND

Photovoltaic modules can convert of photon energy into electric power. Photovoltaic modules that have been recently manufactured or stored under dark conditions can exhibit transient behavior, which can make the photovoltaic module unpredictable and/or unstable when it is being tested or used.

DETAILED DESCRIPTION

Figure 1:
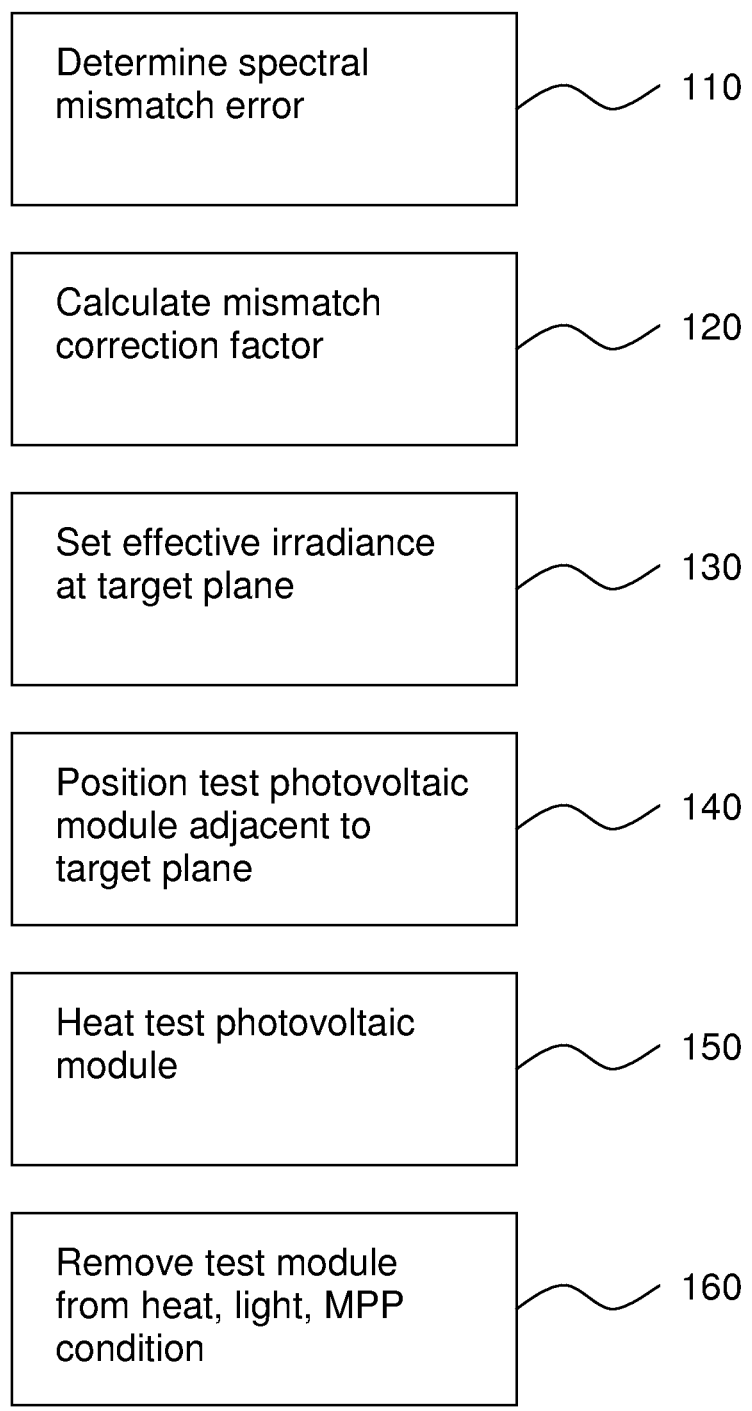
FIG. 1 is a flowchart depicting a pre-testing conditioning process for a photovoltaic module.

Thin-film photovoltaic modules can exhibit transient behavior following storage under dark conditions. Such transient behavior can adversely affect the reliability and consistency of test results for various module performance characteristics, including, for example, current, voltage, power, stability, and general field performance. A photovoltaic module may undergo a conditioning step prior to testing to preserve and improve reliability of results.

A method for conditioning a photovoltaic module for testing can include setting an effective irradiance of a continuous light source at a target plane. The method can include configuring a test photovoltaic module to operate at a substantially maximum power point configuration. The method can include positioning the test photovoltaic module at a known location relative to the target plane such that the target plane of the continuous light source intersects with at least a portion of a surface of the test photovoltaic module. The method can include heating the test photovoltaic module. The method can include configuring the test photovoltaic module for testing. Configuring the test photovoltaic module for testing can include removing the light source. Configuring the test photovoltaic module for testing can include cooling the test module to a testing temperature. Configuring the test photovoltaic module for testing can include reversing the substantially maximum power point configuration.

Setting an effective irradiance can include using a reference device to set an effective irradiance at the target plane. The method can include determining a spectral mismatch error between the test photovoltaic module and the reference device and calculating a mismatch correction factor using the determined spectral mismatch error. The mismatch correction factor can be used to correct the effective irradiance specific to the test photovoltaic module. The step of configuring a test photovoltaic module to operate at a substantially maximum power point configuration can include installing a resistor in the test photovoltaic module. The step of configuring a test photovoltaic module to operate at a substantially maximum power point configuration can include connecting the test photovoltaic module to a maximum power point tracking system.

The effective irradiance can be greater than about 700 W/m$^2$. The effective irradiance can be less than about 1300 W/m$^2$. The effective irradiance can be between about 700 W/m$^2$ and about 1300 W/m$^2$. The step of heating the test photovoltaic module can include heating the test photovoltaic module to a temperature in the range of about 50 degrees C. to about 100 degrees C. The test photovoltaic module can be heated to a temperature of about 70 degrees C. or higher. The test photovoltaic module can be heated to a temperature of about 75 degrees C. or higher, about 80 degrees C. or higher, or about 90 degrees C. or higher.

The step of heating the test photovoltaic module can include heating the test photovoltaic module over a period of greater than about 10 minutes. The step of heating the test photovoltaic module can include heating the test photovoltaic module over a period of greater than about 20 minutes. The step of heating the test photovoltaic module can include heating the test photovoltaic module over a period of greater than about 30 minutes. The step of heating the test photovoltaic module can include heating the test photovoltaic module over a period of less than about 1 hour. The step of heating the test photovoltaic module can include heating the test photovoltaic module over a period of less than about 50 minutes. The step of heating the test photovoltaic module can include heating the test photovoltaic module over a period of less than about 40 minutes. The method can include holding the test photovoltaic module at a substantially constant temperature for less than about 24 hours minutes, after heating the test photovoltaic module. The method can include holding the test photovoltaic module at a substantially constant temperature for less than about 1 hour, after heating the test photovoltaic module. The method can include holding the test photovoltaic module at a substantially constant temperature for less than about 45 minutes, after heating the test photovoltaic module. The method can include holding the test photovoltaic module at a substantially constant temperature for less than about 30 minutes, after heating the test photovoltaic module. The method can include holding the test photovoltaic module at a substantially constant temperature for less than about 15 minutes, after heating the test photovoltaic module. The step of holding the test photovoltaic module at a substantially constant temperature for less than about 15 minutes can include holding the test photovoltaic module at about 85 C for about 10 minutes.

The continuous light source can include sunlight. The continuous light source can include an artificial light source. The step of cooling can include convective cooling. The step of cooling can include directing a flow of air at the test photovoltaic module. The method can include the step of holding the test photovoltaic module substantially at the testing temperature for less than about 5 hours before testing an I(V) characteristics of the test photovoltaic module. The method can include the step of holding the test photovoltaic module substantially at the testing temperature for less than about 3 hours before testing an I(V) characteristics of the test photovoltaic module. The method can include the step of holding the test photovoltaic module substantially at the testing temperature for less than about 2 hours before testing an I(V) characteristics of the test photovoltaic module.

A system for conditioning a photovoltaic module for testing can include a continuous light source for irradiating a target plane intersecting at least a portion of a surface of a test photovoltaic module. The continuous light source can be positioned proximate to the test photovoltaic module. The system can include a maximum power point module operable to permit the test photovoltaic module to operate substantially near maximum power point. The system can include a measuring system which can include a thermal sensor for monitoring a temperature of the test photovoltaic module. The thermal sensor can be positioned in thermal contact with the test photovoltaic module. The measuring system can include a memory component in connection with the thermal sensor via a data interface. The continuous light source can include an artificial light source. The continuous light source can include sunlight. The maximum power point module can include a resistor. The maximum power point module can include a maximum power point tracking system.

Referring to FIG. 1, a method of conditioning a photovoltaic module for performance testing may include, at 110, determining a spectral mismatch error between a test photovoltaic module and a reference device, after first measuring the current-voltage characteristics of the test photovoltaic module at standard reporting conditions. The reference device can set an effective irradiance of a continuous light source at a target plane where the test photovoltaic device is to be positioned. The reference device can include an irradiance sensor. The reference device can include a calibrated and/or tested photovoltaic module. The reference device can include a photovoltaic module designed or modified to set an effective irradiance. Standard reporting conditions may include any suitable total irradiance, including, for example, between about 700 W/m$^2$ and about 1300 W/m$^2$. The total irradiance can be more than about 900 W/m$^2$, more than about 1000 W/m$^2$, or less than about 1100 W/m$^2$. The reference device can be used at any suitable reference temperature, including more than about 20 degrees C., or less than about 30 degrees C. At 120, the spectral mismatch error may be used to calculate a mismatch correction factor.

The reference device can include an irradiance sensor or can be connected to an irradiance sensor and/or any other appropriate measurement/display equipment to monitor the irradiance level at the target plane of a continuous light source. At 130, the effective irradiance can be set at the target plane of the continuous light source to between about 700 W/m$^2$ and about 1300 W/m$^2$. For example, the effective irradiance at the target plane can be set to more than about 900 W/m$^2$, more than about 1000 W/m$^2$, or less than about 1100 W/m$^2$, by applying the mismatch correction factor to the reference device and adjusting the light source intensity. If the continuous light source is natural sunlight, the intensity during conditioning may be between about 950 W/m$^2$ and about 1050 W/m$^2$. A resistor or any suitable maximum power point tracking system may be installed to permit the test photovoltaic module to operate at or near maximum power point. The resistor size may be calculated using the current and voltage at maximum power point (mpp), for example, R=voltage at mpp/current at mpp. A thermal sensor of a module temperature measurement system may be attached to the backside of the test photovoltaic module to monitor module temperature.

At 140, the test photovoltaic module may be placed in the target plane of the continuous light source. At 150, the temperature of the test photovoltaic module may be ramped up from room temperature to between about 50 degrees C. and about 100 degrees C. The test photovoltaic module can be heated to more than about 70 degrees C., more than about 80 degrees C., or less than about 95 degrees C. The ramping up phase at step 150 may occur for any suitable duration, including, for example, between about 5 minutes and 90 minutes. The ramping up phase at step 150 can take more than about 20 minutes, more than about 30 minutes, or more than about 40 minutes. The ramping up phase at step 150 can have a duration of less than about 60 minutes, less than about 50 minutes, or less than about 40 minutes. The test photovoltaic module can be held at the ramp-up temperature for any suitable duration, including, for example, more than about 5 minutes, more than about 8 minutes, or less than about 12 minutes. The test photovoltaic module can be held at the ramp-up temperature for less than about 24 hours. The performance characteristics of the test photovoltaic module may be recorded periodically at regular intervals, for example, approximately once per minute.

At 160, the test photovoltaic module may be removed from the heat, light, and max power point condition, at which point the module may be permitted to cool to a standard reporting condition temperature, for example, more than about 20 degrees C., or less than about 30 degrees C. Cooling may be accelerated by convective means using forced air directed at the module. Once the module has reached the appropriate cool-down temperature, the current-voltage characteristics of the module may be monitored. This measurement step may occur about 2 hours after removal of the module from heat and light exposure. The time between conditioning and measurement may be kept at a minimum, for example, the time between conditioning and measurement can be less than about 24 hours.

Figure 2:
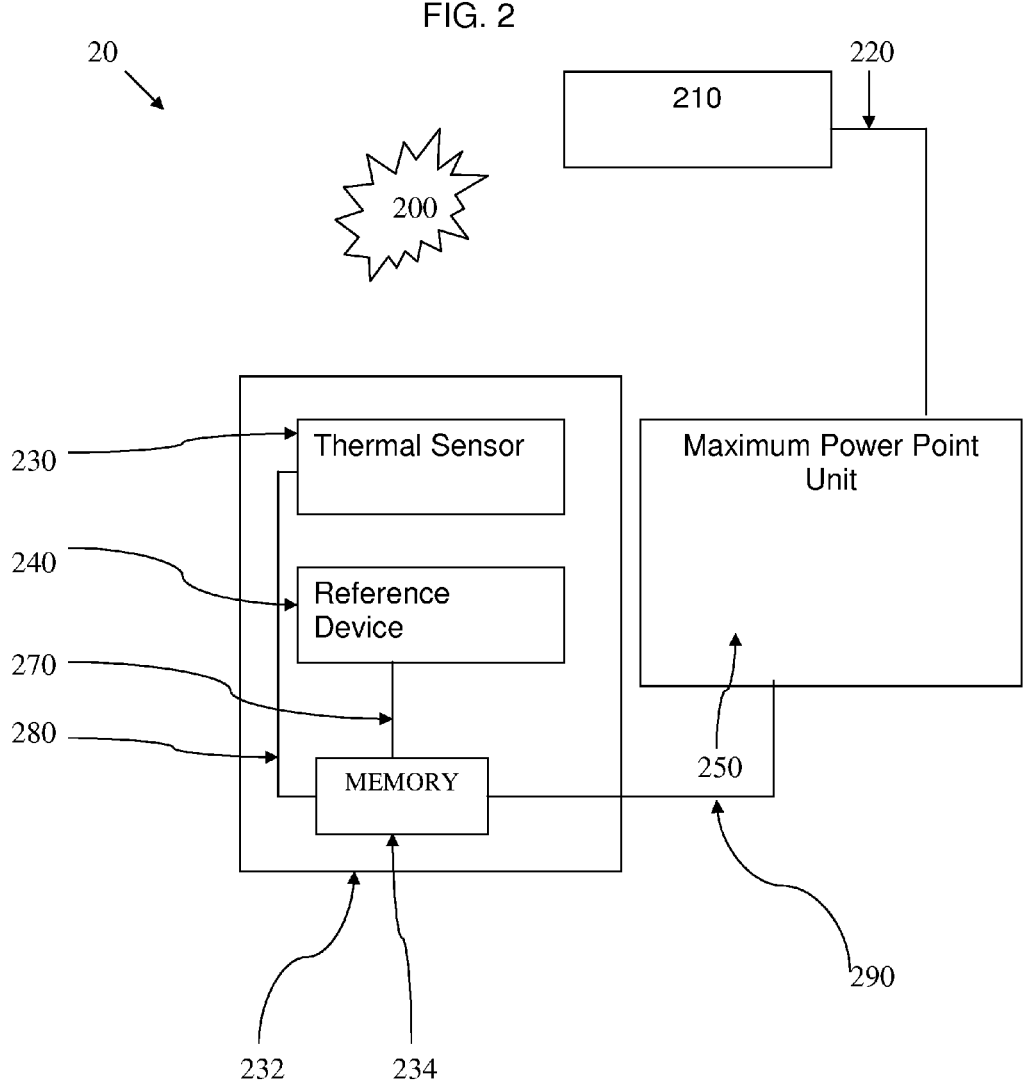
FIG. 2 is a diagram depicting a system that can be used to condition a photovoltaic module for testing.

FIG. 2 depicts a system 20 for conditioning a photovoltaic module for testing. System 20 may include a continuous light source 200. Continuous light source 200 may include any suitable source, including any artificial source or sunlight. Continuous light source 200 may be positioned proximate to test photovoltaic module 210. Continuous light source 200 may irradiate a target plane intersecting at least a portion of a surface of test photovoltaic module 210. Prior to connecting test photovoltaic module 210, an effective irradiance can be set at the target plane using reference device 240, which can include an irradiance sensor. System 20 may also include a maximum power point unit 250, which may be operable to permit test photovoltaic module 210 to operate substantially near maximum power point. Maximum power point unit 250 may be connected to test photovoltaic module 210 using cable 220. System 20 may also include a measuring system 232, which may include a thermal sensor 230, positioned proximate to test photovoltaic module 210. Thermal sensor 230 may be positioned at the back of test photovoltaic module 210, in thermal contact with the module. Reference device 240 and thermal sensor 230 may be connected to memory 234 via cables 270 and 280, respectively. Memory 232 can store temperature and irradiance data from test photovoltaic module 210, which may then be communicated via data interface 290 to maximum power point unit 250 to calculate a maximum power point.

Photovoltaic devices/modules fabricated using the methods and apparatuses discussed herein may be incorporated into one or more photovoltaic arrays. The arrays may be incorporated into various systems for generating electricity. For example, a photovoltaic module may be illuminated with a beam of light to generate a photocurrent. The photocurrent may be collected and converted from direct current (DC) to alternating current (AC) and distributed to a power grid. Light of any suitable wavelength may be directed at the module to produce the photocurrent, including, for example, more than 400 nm, or less than 700 nm (e.g., ultraviolet light). Photocurrent generated from one photovoltaic module may be combined with photocurrent generated from other photovoltaic modules. For example, the photovoltaic modules may be part of a photovoltaic array, from which the aggregate current may be harnessed and distributed.

The embodiments described above are offered by way of illustration and example. It should be understood that the examples provided above may be altered in certain respects and still remain within the scope of the claims. It should be appreciated that, while the invention has been described with reference to the above preferred embodiments, other embodiments are within the scope of the claims.

What is claimed is:

1. A method comprising:
conditioning a photovoltaic module for testing by the acts of:
setting an effective irradiance of a continuous light source at a target plane;
configuring a photovoltaic module to operate at a substantially maximum power point configuration;
positioning the photovoltaic module at a known location relative to the target plane such that the target plane of the continuous light source intersects with at least a portion of a surface of the photovoltaic module;
heating the photovoltaic module; and
configuring the photovoltaic module for testing by removing the light source, cooling the photovoltaic module to a testing temperature, and reversing the substantially maximum power point configuration.

2. The method of claim 1, wherein the step of setting an effective irradiance comprises using a reference device to set an effective irradiance at the target plane.

3. The method of claim 2, further comprising determining a spectral mismatch error between the photovoltaic module and the reference device and calculating a mismatch correction factor using the determined spectral mismatch error, wherein the mismatch correction factor is used to correct the effective irradiance specific to the photovoltaic module.

4. The method of claim 1, wherein the step of configuring the photovoltaic module to operate at a substantially maximum power point configuration comprises installing a resistor in the photovoltaic module.

5. The method of claim 1, wherein the step of configuring the photovoltaic module to operate at a substantially maximum power point configuration comprises connecting the photovoltaic module to a maximum power point tracking system.

6. The method of claim 1, wherein the effective irradiance is greater than about 700 W/m$^2$.

7. The method of claim 1, wherein the effective irradiance is less than about 1300 W/m$^2$.

8. The method of claim 1, wherein the step of heating the photovoltaic module comprises heating the photovoltaic module to a temperature in the range of about 50 degrees C. to about 100 degrees C.

9. The method of claim 1, wherein the step of heating the photovoltaic module comprises heating the photovoltaic module to a temperature above about 75 degrees C.

10. The method of claim 1, wherein the step of heating the photovoltaic module comprises heating the photovoltaic module over a period of greater than about 10 minutes.

11. The method of claim 1, wherein the step of heating the photovoltaic module comprises heating the photovoltaic module over a period of less than about 1 hour.

12. The method of claim 1, further comprising holding the photovoltaic module at a substantially constant temperature for less than about 24 hours, after heating the photovoltaic module.

13. The method of claim 12, wherein the step of holding the photovoltaic module at a substantially constant temperature for less than about 15 minutes comprises holding the photovoltaic module at about 85 degrees C. for about 10 minutes.

14. The method of claim 1, wherein the continuous light source comprises sunlight or an artificial light source.

15. The method of claim 1, wherein the cooling comprises convective cooling or directing a flow of air at the photovoltaic module.

16. The method of claim 1, further comprising the step of holding the photovoltaic module substantially at the testing temperature for less than about 5 hours before testing an I(V) characteristics of the photovoltaic module.

17. A system comprising:
a system for conditioning a photovoltaic module for testing comprising:
a continuous light source for irradiating a target plane intersecting at least a portion of a surface of a photovoltaic module, wherein the continuous light source is positioned proximate to the photovoltaic module;
a maximum power point module operable to permit the photovoltaic module to operate substantially near maximum power point; and
a measuring system comprising:
a thermal sensor for monitoring a temperature of the photovoltaic module, wherein the thermal sensor is positioned in thermal contact with the photovoltaic module; and
a memory component in connection with the thermal sensor via a data interface,
wherein the continuous light source removes the continuous light source from radiating the photovoltaic module and the maximum power point module removes operation of the photovoltaic module at substantially near maximum power point prior to a testing of the photovoltaic module.

18. The system of claim 17, wherein the continuous light source comprises an artificial light source or sunlight.

19. The system of claim 17, wherein the maximum power point module comprises a resistor.

20. The system of claim 19, wherein the maximum power point module comprises a maximum power point tracking system.

* * * * *